(12) United States Patent
Ufongene

(10) Patent No.: US 7,149,429 B2
(45) Date of Patent: Dec. 12, 2006

(54) COARSE WAVELENGTH DIVISION MULTIPLEXING SYSTEM

(75) Inventor: Charles Ufongene, Pine Brook, NJ (US)

(73) Assignee: Fitel USA Corp., Norcross, GA (US)

( * ) Notice: Subject to any disclaimer, the term of this patent is extended or adjusted under 35 U.S.C. 154(b) by 950 days.

(21) Appl. No.: 10/213,508

(22) Filed: Aug. 6, 2002

(65) Prior Publication Data

US 2004/0208562 A1 Oct. 21, 2004

(51) Int. Cl.
*H04J 14/00* (2006.01)
(52) U.S. Cl. ............................. 398/69; 398/58; 398/59; 398/60; 398/63
(58) Field of Classification Search .................. 398/69, 398/58, 59, 60, 63
See application file for complete search history.

(56) References Cited

U.S. PATENT DOCUMENTS 6,205,268 B1   3/2001   Chraplyvy et al. ........... 385/24

2001/0026384 A1* 10/2001 Sakano et al. .............. 359/124

* cited by examiner

*Primary Examiner*—David C. Payne
(74) *Attorney, Agent, or Firm*—Thomas, Kayden, Horstemeyer & Risley, LLP

(57) ABSTRACT

In a ring network comprising a plurality of nodes and a 16 channel coarse wavelength-division multiplexing (CWDM) plan, a technique is disclosed for adding and dropping channels that reduces the maximum attenuation loss that any channel encounters—thereby enabling longer rings to be constructed without using optical amplifiers in the ring. The 16 channels are typically distributed between the wavelengths 1310–1610 nm with 20 nm separation between channels. It is obscured that glass fibers have gradually decreasing loss at longer wavelengths in this band. The network includes a hub and several nodes that are interconnected by optical fibers in a ring configuration, where distance from the hub is the minimum value measure in either the clockwise or counterclockwise direction. Channels are assigned to the various nodes based on their wavelength. The channels whose wavelengths are near 1310 nm are assigned to nodes that are progressively closer to the hub.

25 Claims, 14 Drawing Sheets

| 4-Node Hubbed Ring $N_k$ | node # | Higher-loss-Path | # of Spans on Higher-loss-Path $S_{HLP} = \max([4+1-k], k)$ (5) | Band assignment based on wavelength assignment system of equation (1) |
|---|---|---|---|---|
| Node $N_1$ | 1 | node-$N_1$ to hub | 4 | B(3) |
| Node $N_2$ | 2 | node-$N_2$ to hub | 3 | B(1) |
| Node $N_3$ | 3 | hub to node-$N_3$ | 3 | B(2) |
| Node $N_4$ | 4 | hub to node-$N_4$ | 4 | B(4) |

| Band | Channel # | Node Assignment | # of Spans on Higher-loss-Path | Express Loss (dB) | Mux loss (dB) | Add loss (dB) | Drop loss (dB) | Demux loss (dB) | filter loss (dB) |
|---|---|---|---|---|---|---|---|---|---|
| B(1) | 1 | $N_2$ | 3 | 4 | 0.5 | 1.0 | 1.0 | 2.0 | 8.50 |
|  | 2 |  | 3 | 4 | 1.0 | 1.0 | 1.0 | 1.5 | 8.50 |
|  | 3 |  | 3 | 4 | 1.5 | 1.0 | 1.0 | 1.0 | 8.50 |
|  | 4 |  | 3 | 4 | 2.0 | 1.0 | 1.0 | 0.5 | 8.50 |
| B(2) | 5 | $N_3$ | 3 | 4 | 0.5 | 1.0 | 1.0 | 2.0 | 8.50 |
|  | 6 |  | 3 | 4 | 1.0 | 1.0 | 1.0 | 1.5 | 8.50 |
|  | 7 |  | 3 | 4 | 1.5 | 1.0 | 1.0 | 1.0 | 8.50 |
|  | 8 |  | 3 | 4 | 2.0 | 1.0 | 1.0 | 0.5 | 8.50 |
| B(3) | 9 | $N_1$ | 4 | 6 | 0.5 | 1.0 | 1.0 | 2.0 | 10.50 |
|  | 10 |  | 4 | 6 | 1.0 | 1.0 | 1.0 | 1.5 | 10.50 |
|  | 11 |  | 4 | 6 | 1.5 | 1.0 | 1.0 | 1.0 | 10.50 |
|  | 12 |  | 4 | 6 | 2.0 | 1.0 | 1.0 | 0.5 | 10.50 |
| B(4) | 13 | $N_4$ | 4 | 6 | 0.5 | 1.0 | 1.0 | 2.0 | 10.50 |
|  | 14 |  | 4 | 6 | 1.0 | 1.0 | 1.0 | 1.5 | 10.50 |
|  | 15 |  | 4 | 6 | 1.5 | 1.0 | 1.0 | 1.0 | 10.50 |
|  | 16 |  | 4 | 6 | 2.0 | 1.0 | 1.0 | 0.5 | 10.50 |

FIG. 13

| Bands | Channel # | Assignment | # of spans on Higher-loss-Path path | Connector loss+1dB | Filter + connector loss (dB) | Fiber Atten (dB/km) | Fiber loss (dB) | Ring Perimeter attained at 28dB Allowable loss (km) | Allowable loss (dB) for attained Ring Perimeter of 53.82km (dB) |
|---|---|---|---|---|---|---|---|---|---|
| B(1) | 1 | $N_2$ | 3 | 4.00 | 12.50 | 0.360 | 15.50 | 53.82 | 28.00 |
|  | 2 |  | 3 | 4.00 | 12.50 | 0.335 | 14.43 | 57.82 | 26.93 |
|  | 3 |  | 3 | 4.00 | 12.50 | 0.322 | 13.87 | 60.16 | 26.37 |
|  | 4 |  | 3 | 4.00 | 12.50 | 0.311 | 13.41 | 62.21 | 25.91 |
| B(2) | 5 | $N_3$ | 3 | 4.00 | 12.50 | 0.333 | 14.36 | 58.11 | 26.86 |
|  | 6 |  | 3 | 4.00 | 12.50 | 0.291 | 12.52 | 66.65 | 25.02 |
|  | 7 |  | 3 | 4.00 | 12.50 | 0.281 | 12.09 | 69.02 | 24.59 |
|  | 8 |  | 3 | 4.00 | 12.50 | 0.272 | 11.70 | 71.27 | 24.20 |
| B(3) | 9 | $N_1$ | 4 | 5.00 | 15.50 | 0.266 | 11.45 | 58.76 | 26.95 |
|  | 10 |  | 4 | 5.00 | 15.50 | 0.260 | 11.17 | 60.21 | 26.67 |
|  | 11 |  | 4 | 5.00 | 15.50 | 0.254 | 10.94 | 61.47 | 26.44 |
|  | 12 |  | 4 | 5.00 | 15.50 | 0.252 | 10.83 | 62.10 | 26.33 |
| B(4) | 13 | $N_4$ | 4 | 5.00 | 15.50 | 0.250 | 10.75 | 62.58 | 26.25 |
|  | 14 |  | 4 | 5.00 | 15.50 | 0.250 | 10.76 | 62.52 | 26.26 |
|  | 15 |  | 4 | 5.00 | 15.50 | 0.257 | 11.05 | 60.88 | 26.55 |
|  | 16 |  | 4 | 5.00 | 15.50 | 0.266 | 11.46 | 58.69 | 26.96 |

FIG. 14

| 4-Node Hubbed Ring $N_k$ | node # | Higher-loss-Path | # of Spans on Higher-loss-Path $S_{HLP} = \max(\lceil 4+1-k \rceil, k)$ (5) | Band assignment based on no Wavelength Assignment System |
|---|---|---|---|---|
| Node $N_1$ | 1 | node-$N_1$ to hub | 4 | B(1) |
| Node $N_2$ | 2 | node-$N_2$ to hub | 3 | B(2) |
| Node $N_3$ | 3 | hub to node-$N_3$ | 3 | B(3) |
| Node $N_4$ | 4 | hub to node-$N_4$ | 4 | B(4) |

FIG. 15

| Band | Channel # | Node Assignment | Number of spans on longer path | Express Loss (dB) | Mux loss (dB) | Add loss (dB) | Drop loss (dB) | Demux loss (dB) | Filter loss (dB) |
|---|---|---|---|---|---|---|---|---|---|
| B(1) | 1 | $N_1$ | 4 | 6.0 | 0.5 | 1.0 | 1.0 | 2.0 | 10.5 |
|  | 2 |  | 4 | 6.0 | 1.0 | 1.0 | 1.0 | 1.5 | 10.5 |
|  | 3 |  | 4 | 6.0 | 1.5 | 1.0 | 1.0 | 1.0 | 10.5 |
|  | 4 |  | 4 | 6.0 | 2.0 | 1.0 | 1.0 | 0.5 | 10.5 |
| B(2) | 5 | $N_2$ | 3 | 4.0 | 0.5 | 1.0 | 1.0 | 2.0 | 8.5 |
|  | 6 |  | 3 | 4.0 | 1.0 | 1.0 | 1.0 | 1.5 | 8.5 |
|  | 7 |  | 3 | 4.0 | 1.5 | 1.0 | 1.0 | 1.0 | 8.5 |
|  | 8 |  | 3 | 4.0 | 2.0 | 1.0 | 1.0 | 0.5 | 8.5 |
| B(3) | 9 | $N_3$ | 3 | 4.0 | 0.5 | 1.0 | 1.0 | 2.0 | 8.5 |
|  | 10 |  | 3 | 4.0 | 1.0 | 1.0 | 1.0 | 1.5 | 8.5 |
|  | 11 |  | 3 | 4.0 | 1.5 | 1.0 | 1.0 | 1.0 | 8.5 |
|  | 12 |  | 3 | 4.0 | 2.0 | 1.0 | 1.0 | 0.5 | 8.5 |
| B(4) | 13 | $N_4$ | 4 | 6.0 | 0.5 | 1.0 | 1.0 | 2.0 | 10.5 |
|  | 14 |  | 4 | 6.0 | 1.0 | 1.0 | 1.0 | 1.5 | 10.5 |
|  | 15 |  | 4 | 6.0 | 1.5 | 1.0 | 1.0 | 1.0 | 10.5 |
|  | 16 |  | 4 | 6.0 | 2.0 | 1.0 | 1.0 | 0.5 | 10.5 |

FIG. 16

| Band | Channel # | Node Assignment | Number of spans on path | connector loss+1dB | Filter + connector loss (dB) | Fiber Atten (dB/km) | Fiber loss (dB) | Ring perimeter (km) | Allowable loss (dB) |
|---|---|---|---|---|---|---|---|---|---|
| B(1) | λ1 | N₁ | 4 | 5 | 15.5 | 0.360 | 12.50 | 43.40 | 28.00 |
| | λ2 | | 4 | 5 | 15.5 | 0.335 | 11.63 | 46.63 | 27.13 |
| | λ3 | | 4 | 5 | 15.5 | 0.322 | 11.18 | 48.52 | 26.68 |
| | λ4 | | 4 | 5 | 15.5 | 0.311 | 10.81 | 50.17 | 26.31 |
| B(2) | λ5 | N₂ | 3 | 4 | 12.5 | 0.333 | 11.58 | 58.11 | 24.08 |
| | λ6 | | 3 | 4 | 12.5 | 0.291 | 10.09 | 66.65 | 22.59 |
| | λ7 | | 3 | 4 | 12.5 | 0.281 | 9.75 | 69.02 | 22.25 |
| | λ8 | | 3 | 4 | 12.5 | 0.272 | 9.44 | 71.27 | 21.94 |
| B(3) | λ9 | N₃ | 3 | 4 | 12.5 | 0.266 | 9.23 | 72.87 | 21.73 |
| | λ10 | | 3 | 4 | 12.5 | 0.260 | 9.01 | 74.66 | 21.51 |
| | λ11 | | 3 | 4 | 12.5 | 0.254 | 8.83 | 76.22 | 21.33 |
| | λ12 | | 3 | 4 | 12.5 | 0.252 | 8.74 | 77.00 | 21.24 |
| B(4) | λ13 | N₄ | 4 | 5 | 15.5 | 0.250 | 8.67 | 62.58 | 24.17 |
| | λ14 | | 4 | 5 | 15.5 | 0.250 | 8.68 | 62.52 | 24.18 |
| | λ15 | | 4 | 5 | 15.5 | 0.257 | 8.91 | 60.88 | 24.41 |
| | λ16 | | 4 | 5 | 15.5 | 0.266 | 9.24 | 58.69 | 24.74 |

◇ - TOTAL RING ATTENUATION
□ - FILTER AND CONNECTION ATTENUATION
● - FIBER ATTENUATION

◇ - WAVELENGTH ASSIGNMENT SYSTEM
● - ASSIGNED WITHOUT PREFERENCE

◇ - WAVELENGTH ASSIGNMENT SYSTEM
● - ASSIGNED WITHOUT PREFERENCE

COARSE WAVELENGTH DIVISION MULTIPLEXING SYSTEM

TECHNICAL FIELD OF THE INVENTION

The present invention is generally related to communications and, more particularly, to optical communication networks.

BACKGROUND OF THE INVENTION

Optical communication networks have increasingly been seen as the solution to many bandwidth problems that occur fairly frequently on other networks. Optical communication networks use optical fibers, which are typically less susceptible to external noise than other media and are typically cheaper to make than copper wire. Furthermore, optical fibers provide greater bandwidth than copper wires, which results in higher data rates. Typically, data streams that are transferred through a communications system can be divided from each other according to several different protocols. In optics, the data streams are often separated by wavelength. Protocols that separate data based on wavelength are generally referred to as wavelength division multiplexing (WDM) protocols.

WDM in fiber optics is typically either dense wavelength division multiplexing (DWDM), or coarse wavelength division multiplexing (CWDM). CWDM has only recently been standardized by the International Telecommunications Union Standards Committee (ITU-T) as the G.694.2 CWDM channel grid. The deployment capability of CWDM systems is enhanced by the introduction of zero water-peak fibers (ZWPFs) (ITU-T G.652.C) such as the AllWave® fiber, a zero water peak fiber available from OFS Fitel of Norcross, Ga. ZWPFs remove most of the hydroxyl (OH) ions that remain in manufactured optical fiber. Hydroxyl ions are removed because of the fact that these hydroxyl ions resonate in several different modes. More particularly, the resonation of the hydroxyl ions causes an attenuation peak at about 1400 nm in the optical spectrum. Consequently, ZWPFs offer up to 33% more CWDM capacity than standard single mode fiber (SSMF).

CWDM systems operate as passive systems, with wide divisions between the wavelength channels used to transmit data. Thus, CWDM typically uses the entire available optical spectrum to transmit 16 channels of network traffic. These wavelengths range from about 1310 nm to about 1610 nm, with channels spaced 20 nm from each other. This wide channel spacing allows for less precision with respect to the lasers used for transmitting signals and less precision in the filtering devices used to filter adjacent channels.

In contrast, DWDM systems are active systems, typically transmitting on a variable number of channels with 1.6 nm, 0.8 nm or 0.4 nm spacing, depending upon the implementation. The narrow channel spacing requires very precise filters with high selectivity. Such highly selective filters increase the expense of the system. Moreover, the narrow channel spacing requires high precision, cooled lasers which exhibit low wavelength drift and dispersion characteristics, thereby also increasing the expense of the system. However, because of the active nature of the system, a signal may be transmitted farther along the fiber, thereby increasing the circumference of networks having a hubbed-ring configuration.

It would be desirable to increase the coverage area of CWDM systems to compete with DWDM systems, particularly in cost sensitive environments. Consequently, a need exists for a system and method that address these and/or other shortcomings of existing CWDM systems.

SUMMARY OF THE INVENTION

One embodiment, among others, of the present invention provides systems and methods for assignment of wavelengths in an optical communication network. A representative system includes a plurality of nodes operable to be coupled together by an optical fiber. The optical fiber is operable to transport a plurality of wavelength bands, with each of the nodes being assigned to a wavelength band in response to an attenuation level, including attenuation introduced by the fiber and by the plurality of nodes.

An alternative embodiment of the network node includes a demultiplexer coupled to a receiver and a network through a first optical fiber. The demultiplexer is operable to separate an optical receive signal on a first plurality of wavelengths from a second plurality of wavelengths on the first optical fiber. The node further includes a multiplexer coupled to a transmitter and the network through a second optical fiber. The multiplexer is operable to combine the second plurality of wavelengths with an optical transmit signal on the second plurality of wavelengths on the second optical fiber. The first plurality of wavelengths are the wavelengths that optimize the transmission characteristics of the network.

A method of the present invention for maximizing the coverage of an optical communication network includes creating an optical network comprising a plurality of nodes, and assigning a plurality of wavelength groups to the plurality of nodes based upon the ring loss and fiber loss of the optical network.

A method of the present invention for assigning wavelengths in an optical communication network includes finding a highest ring loss node on the optical network, assigning a lowest fiber loss wavelength to the highest filter loss node, and iteratively assigning each remaining node to a remaining wavelength based upon a highest remaining ring loss node getting a lowest remaining fiber loss wavelength.

Other embodiments, features and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 13 is a table detailing the components of the filter loss for each node of FIG. 9.

FIG. 14 is a table detailing the total loss of each of the channels on the network of FIG. 9, including the connector loss, filter loss and fiber loss.

FIG. 15 is a table detailing the assignment used in FIG. 2.

FIG. 16 is a table detailing the components of the filter loss for each node of FIG. 2.

DETAILED DESCRIPTION OF THE PREFERRED EMBODIMENTS

Figure 1:
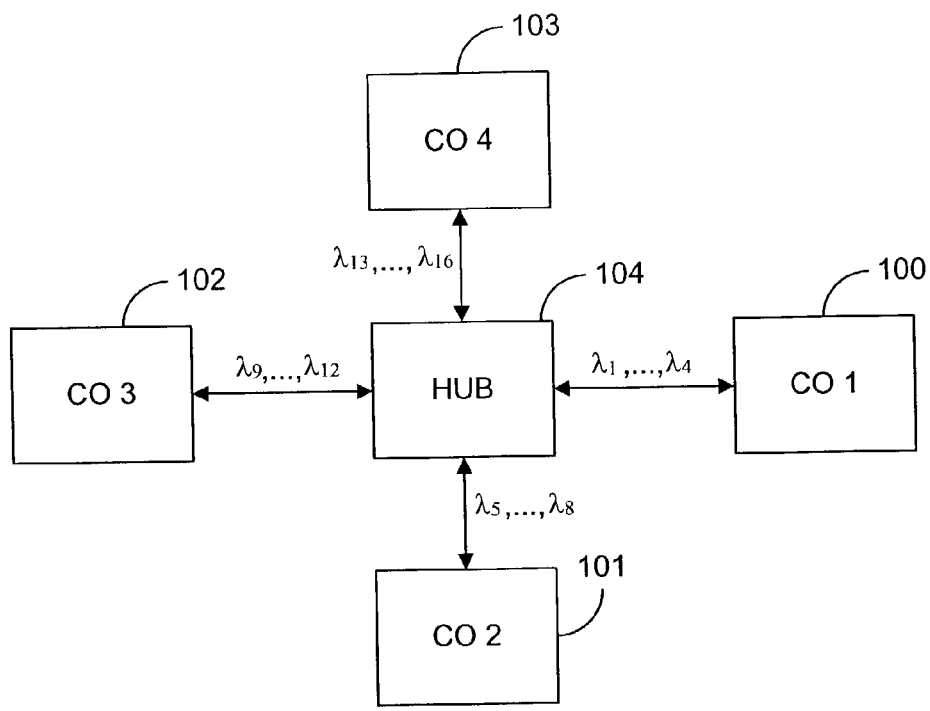
FIG. 1 is a block diagram illustrating a logical star optical network.

The invention now will be described more fully with reference to the accompanying drawings. The invention may, however, be embodied in many different forms and should not be construed as being limited to the embodiments set forth herein; rather, these embodiments are intended to convey the concepts and principles of the invention to those skilled in the art. Furthermore, all "examples" given herein are intended to be non-limiting.

CWDM is capable of enabling multi-wavelength optical systems to be introduced into metropolitan (metro) networks inexpensively. Compared to DWDM, CWDM achieves cost reduction via the use of cheaper wide-channel spacing filters. These wide-channel spacing filters allow less expensive non-cooled lasers to be used in CWDM systems. However, because CWDM systems are non-amplified, the attainable system reach currently is severely limited by filter and fiber attenuation losses.

The wavelength assignment system of the present invention presents a CWDM network design approach that can be employed to maximize the perimeter of a 16-channel CWDM hubbed or meshed ring network based on zero water peak fiber (ZWPF). ZWPF, such as AllWave®, available from OFS Fitel, of Norcross, Ga., typically includes fiber attenuation of a signal as a function of wavelength of the signal. This fiber attenuation is at a maximum in the O-band and decreases to a minimum in the C-band before increasing slightly in the L-band. The wavelength assignment system of the present invention assigns wavelength bands to each of the nodes of the network, such that the filter losses incurred by the wavelengths around the ring is a minimum in the O-band and increases to a maximum in the L-band. Hence the filter loss compensates the fiber attenuation loss, yielding a ring (combined fiber and filter) loss that is minimized across the CWDM channel spectrum thereby maximizing the ring perimeter.

The ITU-T G.694.2 CWDM channel plan uses 16 non-amplified channels, with center wavelengths at 1310 nm, 1330, 1350 nm . . . 1610 nm in 20 nm channel spacing. The channel plan, extending from O-band to the L-band is made possible by the development of ZWPFs with very low water peak fiber attenuation at 1400 nm, resulting in the channel fiber attenuation loss as shown in FIG. 1.

CWDM systems achieve cost reduction in comparison to DWDM systems through the use of multiplexing and demultiplexing filters with wide channel spacing and wide passband. Filters used in DWDM systems have very narrow Gaussian passband and are typically spaced at 50, 100 or 200 GHz, or 0.4, 0.8 and 1.6 nm when centered on 1551 nm. To prevent inter-channel cross-talk, DWDM systems therefore use highly stabilized optical sources with very narrow spectral width.

CWDM systems on the other hand employ filters with 20 nm channel spacing and 13–14 nm passband which allow the filters to be more cheaply produced. Further, the relaxed filter tolerances also allow the use of cheaper uncooled lasers in CWDM systems. However, since the CWDM systems are non amplified the attainable coverage is limited by the filter, connector, splice and fiber losses. The task is to develop a wavelength assignment which when applied to a 16-channel CWDM n-node ring hubbed network, minimizes those losses and increases the network coverage area.

Figure 2:
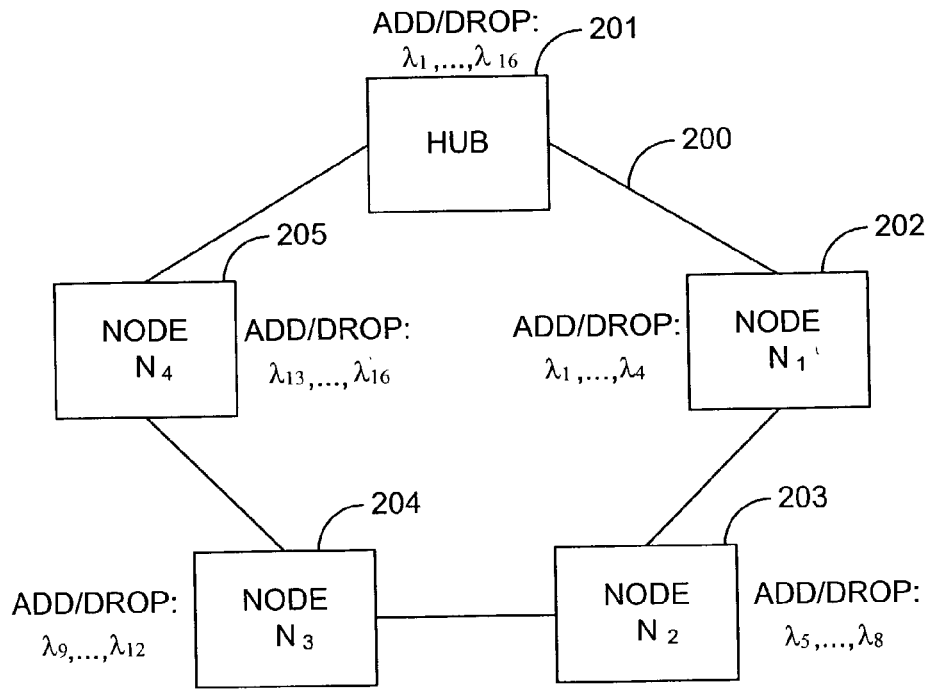
FIG. 2 is a block diagram illustrating a four node hubbed ring network, equivalent to the logical star optical network of FIG. 1, using prior art wavelength assignment.

In typical prior embodiments, a four node logical star network is assigned wavelengths without preference, as shown in FIG. 1. In the four node logical star configuration four local exchanges 100–103 (Central Offices) transmit and receive signals from a tandem exchange 104, each on a set of four wavelength channels. The logical star network can be reconfigured as a 4-node CWDM hubbed ring equivalent network, as shown in FIG. 2.

In the hubbed ring network, all 16 channels of the network are supported on a single AllWave® fiber 200. The hubbed ring network includes a "hub" 201, surrounded by four nodes 202–205. The hub 201 and the nodes 202–205 are coupled together in series by a ZWPF. Moreover, each of the nodes 202–205 are configured to communicate with the hub 201 on a set of predetermined channels. In typical prior configurations, these channels are assigned in no particular order. As such, node $N_1$ is typically assigned to communicate on channels 1–4, node $N_2$ is assigned to communicate on channels 5–8, node $N_3$ is assigned to communicate on channels 9–12, node $N_4$ is assigned to communicate on channels 13–16.

Figure 3:
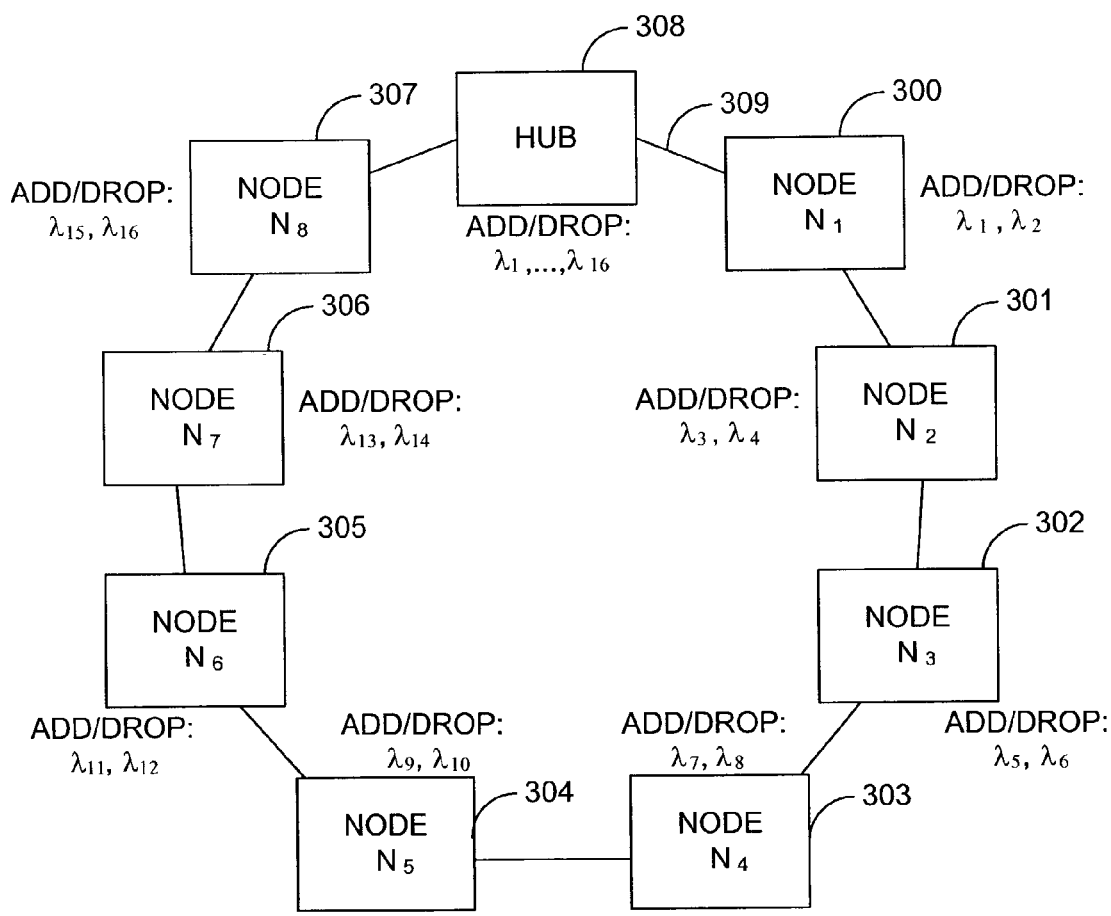
FIG. 3 is a block diagram illustrating an eight node hubbed ring optical network using prior art wavelength assignment.

Similarly, an alternative typical prior embodiment includes an eight node hubbed ring network, as shown in FIG. 3. Here there are eight nodes 300–307 configured around a tandem exchange 308. Again, each of the nodes are connected together by a ZWPF 309. Each of the nodes 300–307 is configured to communicate with the hub on a predetermined set of channels. In typical in prior systems, each node would be sequentially assigned the next pair of available channels, as shown in FIG. 3. As such, node $N_1$ is assigned to communicate on channels 1–2, $N_2$ on channels 3–4, $N_3$ on channels 5–6, etc.

Figure 4:
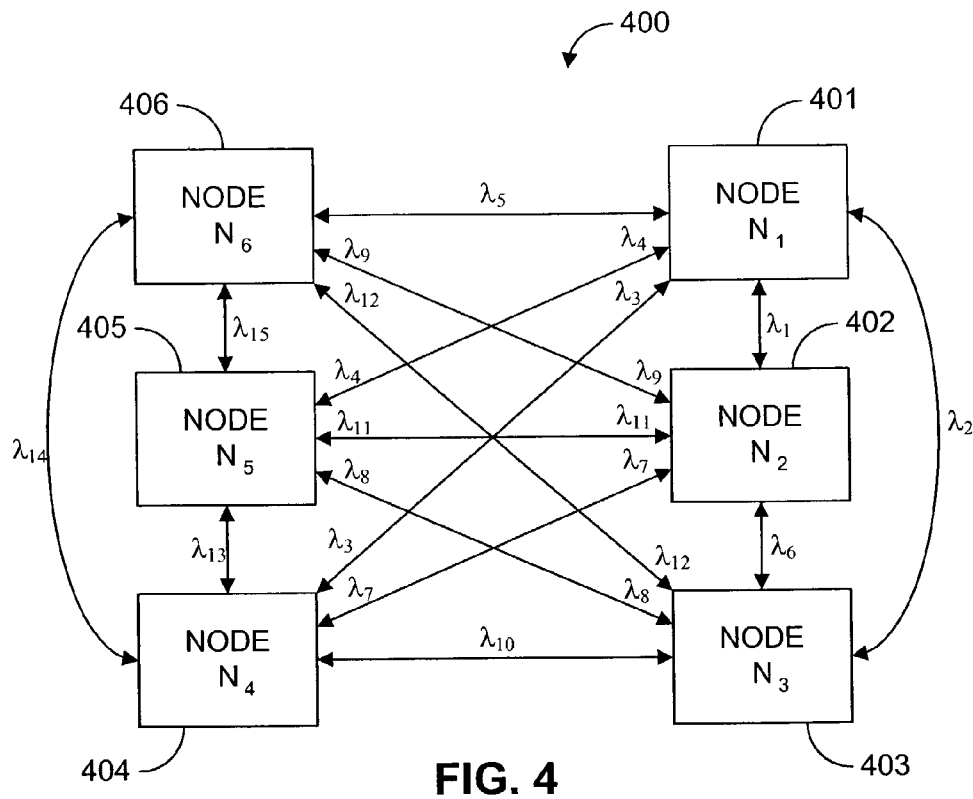
FIG. 4 is a block diagram illustrating a six node logical mesh optical network.

Referring now to FIG. 4, shown is an alternative embodiment, among others, of a network configuration assigning wavelengths using a typical prior art method. Shown is a six node logical mesh network 400. Each of the nodes 401–406 communicates with each of the other nodes 401–406. As such, node 401 has a bi-directional communications path with each of the other nodes 402–406. Each of the nodes has a similar functionality with respect to communication with the other nodes. Here, each node communicates with every other node over a dedicated wavelength channel. This six node logical mesh network can be reconfigured as a logical mesh physic ring network as shown in FIG. 5.

Figure 5:
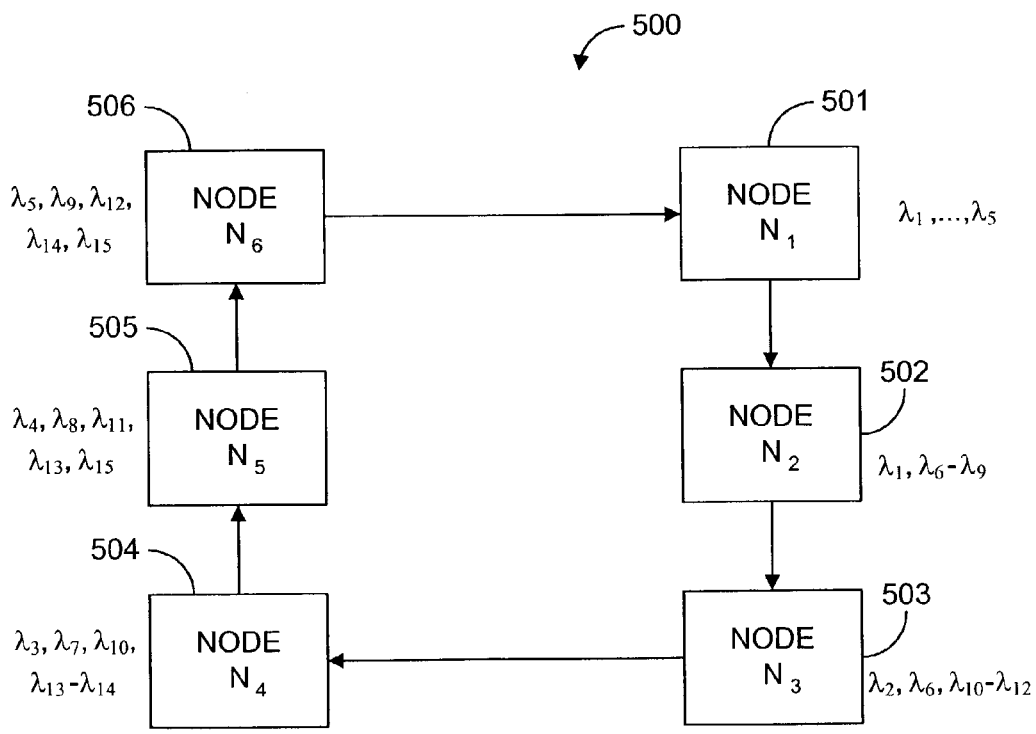
FIG. 5 is a block diagram illustrating a six node meshed ring optical network, equivalent to the logical mesh optical network of FIG. 4, using prior art wavelength assignment.

Referring now to FIG. 5, shown is a typical six node logical mesh physical ring network 500 that can be used in conjunction with the present invention, which network is also a logical equivalent to the logical mesh network of FIG. 4. In the four node logical mesh physical ring network 500 each of the nodes 501–506 each having a unidirectional communications link with the succeeding node. Thus, node 501 can send information in the clockwise direction through other nodes.

In typical prior art configurations, the wavelength channels are assigned as they are in FIG. 5. In this configuration, node $N_1$ 501 can communicate with $N_2$ 502 on channel 1, with $N_3$ 503 on channel 2, with $N_4$ 504 on channel 3, etc. In turn, node $N_2$ 502 can communicate with $N_3$ 503 on channel 6, with $N_4$ 504 on channel 7, etc. Each successive node can be assigned a communications channel with each remaining node on a similar basis. Therefore, each node has a specific communications path with every other node, making the logical mesh physical ring 500 equivalent to the logical mesh network 400 (FIG. 4).

Moreover, one skilled in the art will recognize that the logical mesh physical ring network equivalence can support up to a six node logical mesh network with the available 16 channels. Each of the lesser node logical mesh channels and logical mesh physical ring channels are intended to be included within the present invention.

Figure 6:
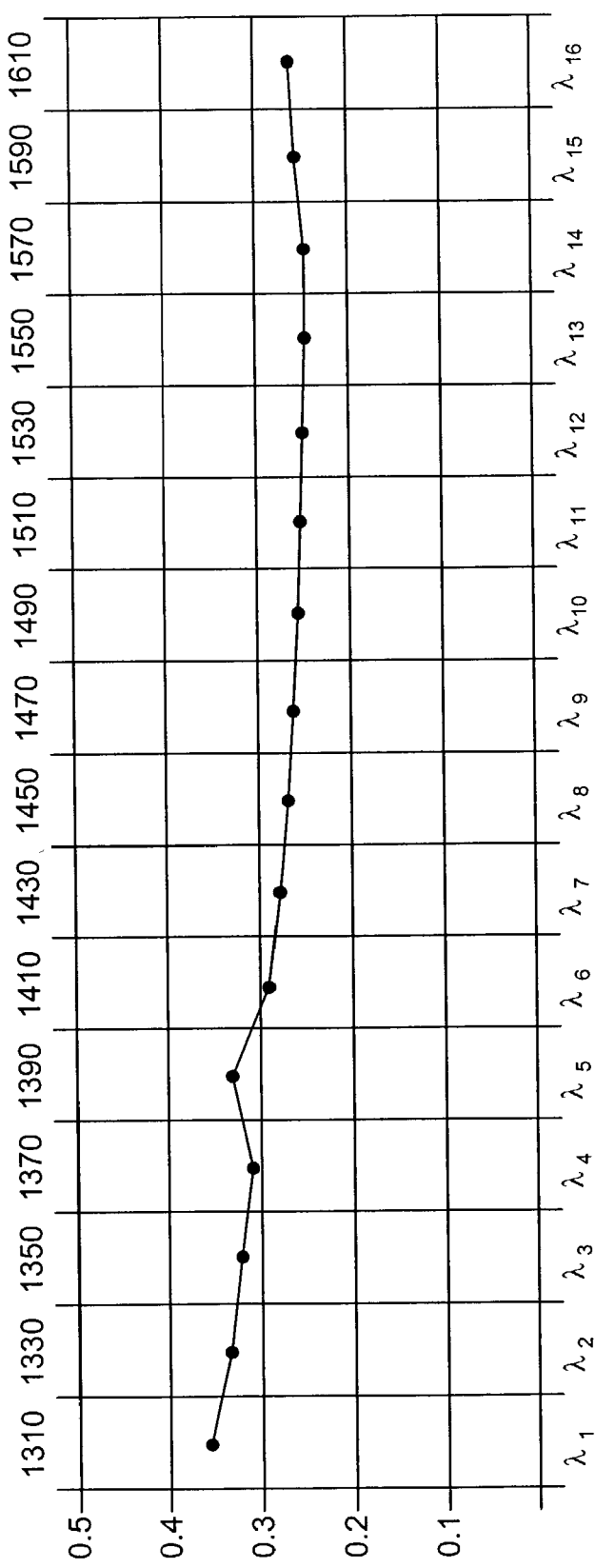
FIG. 6 is a chart illustrating the attenuation at various wavelengths on a zero water peak fiber used in conjunction with the present invention.

Referring now to FIG. 6, shown is the attenuation of the AllWave® ZWPF plotted as a function of wavelength in the 16-channel CWDM channel plan. The intrinsic fiber attenuation of the AllWave® fiber decreases from 0.36 dB/km at 1310 nm to 0.25 dB/km at 1570 nm, and thereafter increases to 0.266 dB/km at 1610 nm. Across the CWDM channel spectrum, fiber attenuation is a maximum in the O-band and approximately decreases to a minimum in the C-band before increasing slightly in the L-band. Therefore, if the filter loss incurred by the wavelengths in an n-node ring hubbed network is minimum in the O-band and approximately increases to a maximum in the L-band, then the filter loss has an inverse slope to the fiber loss slope across the CWDM channel spectrum. The filter loss then compensates the fiber loss, resulting in a ring loss (the combined filter and fiber losses) minimization across the CWDM channel spectrum which has the effect of increasing the ring perimeter. The wavelength assignment system that achieves this objective is presented below.

Figure 7:
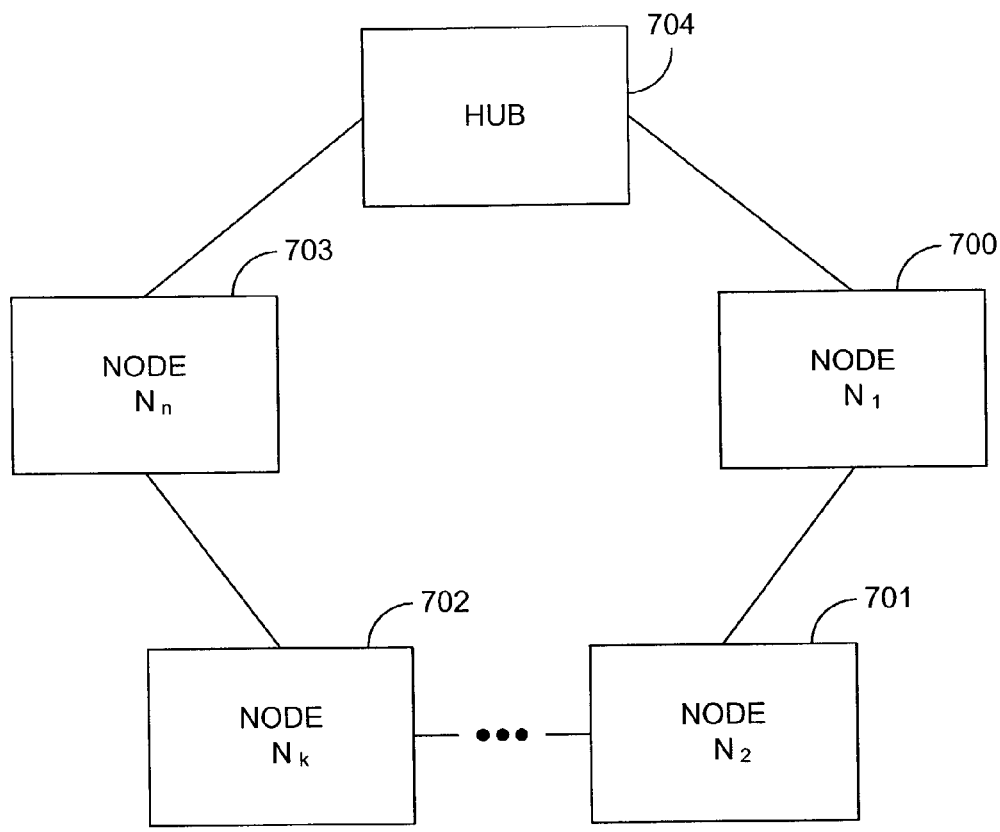
FIG. 7 is a block diagram illustrating an n-node hubbed ring optical network used in deriving the wavelength assignment system of the present invention.

Referring now to FIG. 7, shown is a 16-Channel CWDM n-node hubbed ring equivalent network which will be used in the derivation of the wavelength assignment system of the present invention. The n nodes 700–703 are numbered clockwise sequentially from the hub 704: $N_1$, $N_2$, $N_k$, $N_n$. The 16 CWDM channels $\{\lambda_1, \lambda_2, \ldots \lambda_{16}\}$, are divided into n (n=4, 8, etc.) sets or bands: B(1), B(2), B(j), ... B(n), (j=1 ... n), satisfying the condition: fiber attenuation of B(1)≧fiber attenuation of B(2)≧ ... ≧fiber attenuation of B(n). In other words, the intrinsic fiber attenuation loss is maximum in band B(1), and decreases to a minimum in band B(n).

The wavelength assignment system of the present invention, which minimizes the ring loss (combined fiber, connector, splicing and filter losses) for a wavelength channel $\lambda_i$ assigned to node-$N_k$ is as follows:

$$N_k \xrightarrow{\text{is assigned}} B \begin{cases} (n+1-2k) & \text{if } n+1 > 2k \\ (2k-n) & \text{if } 2k \geq n+1 \end{cases} \quad (1)$$

Where B(j) is the wavelength band assigned to node-$N_k$, (j=n+1−2k or j=2k−n), n is the number of nodes in the ring, and k is the node number and k=1 ... n.

This assignment yields a minimum filter loss in band B(1), and increases to a maximum in band B(n). In other words, filter loss of B(1)≦filter loss of B(2)≦ ... ≦filter loss of B(n).

The wavelength assignment system of the present invention, as shown in equation (1), yields a maximized ring of perimeter:

$$R = \min\left\{\left\{\left(\frac{n+1}{n}\right)\left(\frac{P - S - F(\lambda_i, k) - C(\lambda_i, k)}{A(\lambda_i)}\right)\right\} \,\bigg|\, \text{for } i = 1 \ldots 16\right\} \quad (2)$$

where, P: Source power; S: Receiver sensitivity; $C(\lambda_i, k)$: Connector loss incurred by wavelength assigned to node $N_k$; $F(\lambda_i, k)$: Filter Insertion loss incurred by wavelength assigned to node $N_k$; and $A(\lambda_i)$: Fiber Attenuation coefficient at wavelength $\lambda_i$.

Since the loss incurred by a wavelength channel between the hub and a node on the hub-to-node path is generally different from the loss the wavelength incurs on the node-to-hub path, the ring loss budget must be based on the path with higher loss. We make a distinction between two types of losses in the ring: fiber loss, which is attenuation dependent; and filter, connector and splice losses which are non-attenuation dependent. The non-attenuation dependent losses incurred by a wavelength are independent of span lengths. It is a function of the number of mux/demux filter stages and the number of spans that a wavelength traverses on its path between transmission and reception. Therefore, to determine the higher non attenuation dependent loss path between hub-to-node and node-to-hub paths it is sufficient to determine only the path with more spans.

Referring again to FIG. 7, proceeding clockwise on the node-$N_k$-to-hub path, the number of spans traversed by a wavelength $\lambda_i$ assigned to node-$N_k$ is given by:

$$S_{NkH} = (n+1-k). \quad (3)$$

Similarly, proceeding clockwise on the hub-to-node-$N_k$ path, the number of spans traversed by a wavelength $\lambda_i$ assigned to node-$N_k$ is given by:

$$S_{HNk}=k \qquad (4)$$

Therefore, the number of spans on the Higher-loss-Path is:

$$S_{HLP}=\max([n+1-k],k) \qquad (5)$$

From (3) & (5), if node-$N_k$-to-hub path is Higher-loss-Path, then, $$(n+1-k)>k \Rightarrow (n+1)>2k \qquad (6a)$$

From (4) & (5), if hub-to-node-$N_k$ path is Higher-loss-Path, then, $$k>(n+1-k) \Rightarrow 2k>(n+1) \qquad (6b)$$

The system of the present invention for assigning the wavelength bands to the nodes are developed from the two cases represented in (6a) and (6b).

The first case occurs when the node-$N_k$-to-hub path is the higher-loss-path $$\Rightarrow (n+1)>2k \qquad (6a)$$

The number of bands at node $N_k=(n-k)$, and the number of nodes already assigned with bands=$(k-1)$. Hence, the available bands at node-$N_k$ are $[(n-k)-(k-1)]=(n+1-2k)$ for (k=1, 2, ... <(n+1)/2). Therefore, node-$N_k$ is assigned the (n+1-2k)th. band as follows:

$$N_k \xrightarrow{\text{is assigned}} B(n+1-2k) \text{ if } (n+1)>2k. \qquad (7)$$

The second case occurs when the hub-to-node-$N_k$ path is the higher-loss-path $$\Rightarrow 2k>(n+1) \qquad (6b)$$

The number of available bands at node $N_k=[k-(n-k)]=(2k-n)$ for $(2k>n+1)$. Therefore, node-$N_k$ is assigned the (2k-n)th. band as follows:

$$N_k \xrightarrow{\text{is assigned}} B(2k-n) \text{ if } (2k>n+1) \qquad (8)$$

Hence, combining (7) and (8) gives:

$$N_k \xrightarrow{\text{is assigned}} B \begin{cases} (n+1-2k) & \text{if } n+1>2k \\ (2k-n) & \text{if } 2k>n+1 \end{cases} \qquad (1)$$

Where B(j) is the wavelength band assigned to node-$N_k$, j=n+1-2k or j=2k-n), and n is the number of nodes in the ring, k is the node number and k=1 ... n. The wavelength assignment system of the present invention is symmetric, in other words, the nodes could have been numbered in a counter clockwise order with the same result. Also, the assignment system of the present invention is equally valid for rings with regular/irregular span spacing.

The total ring loss $L(\lambda_i,k)$ incurred by a channel consists of filter, fiber connector and splicing losses and is a function of wavelength $\lambda_i$ and the node $N_k$ to which $\lambda_i$ is assigned $$L(\lambda_i,k)=F_i(\lambda_i,k)+W(\lambda_i,k)+C(\lambda_i,k). \qquad (9)$$

Where, $F(\lambda_i,k)$ is the filter insertion loss incurred by wavelength $\lambda_i$ assigned to node $N_k$, $W(\lambda_i,k)$ is the fiber attenuation loss incurred by wavelength $\lambda_i$, and $C(\lambda_i,k)$ is the connector loss+system margin incurred by wavelength $\lambda_i$.

The ring perimeter is constrained to the smallest circumference $R(\lambda_i)$ attained by the wavelength $\lambda_i$ with the highest loss. The maximum number of spans traversed by a signal around the n-node ring is between the hub and its adjacent nodes—nodes $N_n$ and $N_1$. In both cases, a signal traverses n spans. Therefore, assuming the nodes are equally spaced around the ring then, the fiber loss is:

$$W(\lambda_i,k)=nDA(\lambda_i) \qquad (10)$$

where D is the ring span length. The ring perimeter attained by wavelength $\lambda_i$ is given by:

$$R(\lambda_i,k)=(n+1)D. \qquad (11)$$

Substituting (11) in (10) yields:

$$W(\lambda_i,k) = \left(\frac{n}{n+1}\right) A(\lambda_i) R(\lambda_i, k) \qquad (12)$$

From (9) and (12) it can be concluded:

$$L(\lambda_i, k) = F(\lambda_i, k) + \left(\frac{n}{n+1}\right) A(\lambda_i) R(\lambda_i, k) + C(\lambda_i, k). \qquad (13)$$

If P is the power in each channel and S the receiver sensitivity then, $$P = L(\lambda_i, k) + S = F(\lambda_i, k) + \left(\frac{n}{n+1}\right) A(\lambda_i) R(\lambda_i, k) + C(\lambda_i, k) + S. \qquad (14)$$

Hence it follows from (14) that for source power P and detector sensitivity S, the ring perimeter attainable by wavelength $\lambda_i$ is:

$$R(\lambda_i) = \left(\frac{n+1}{n}\right)\left(\frac{P - S - F(\lambda_i, k) - C(\lambda_i, k)}{A(\lambda_i)}\right). \qquad (15)$$

Thus, for same power P, the 16 channels will yield different ring perimeters due to differences in fiber, filter connector and splice losses incurred by the wavelengths. As i varies over the set of 16 wavelengths, a set of 16 ring circumferences is generated. If R is the minimum value of the set $\{R(\lambda_i)|\text{for } i=1 \ldots 16\}$, then $$R=\min(\{R(\lambda_i)|\text{for } i=1 \ldots 16\}) \qquad (16)$$

or, $$R = \min\left(\left\{\left(\frac{n+1}{n}\right)\left(\frac{P - S - F(\lambda_i, k) - C(\lambda_i, k)}{A(\lambda_i)}\right)\right| \text{ for } i = 1 \ldots 16\right\}\right). \qquad (17)$$

For the same receiver sensitivity S, the other lower loss wavelength channels require power $P(\lambda_i)<P$ to yield the ring perimeter R. Hence the power required in wavelength channel $\lambda_i$ assigned to node $N_k$ to attain the ring perimeter R is given by:

$$P(\lambda_i) = F(\lambda_i, k) + \left(\frac{n}{n+1}\right) A(\lambda_i, k) R + C(\lambda_i, k) + S. \quad (18)$$

Then, from equations (12) and (15), it can be concluded that the fiber loss in the ring is:

$$W(\lambda_i, k) = P - S - F(\lambda_i, k) - C(\lambda_i, k) \quad (19)$$

Figure 8:
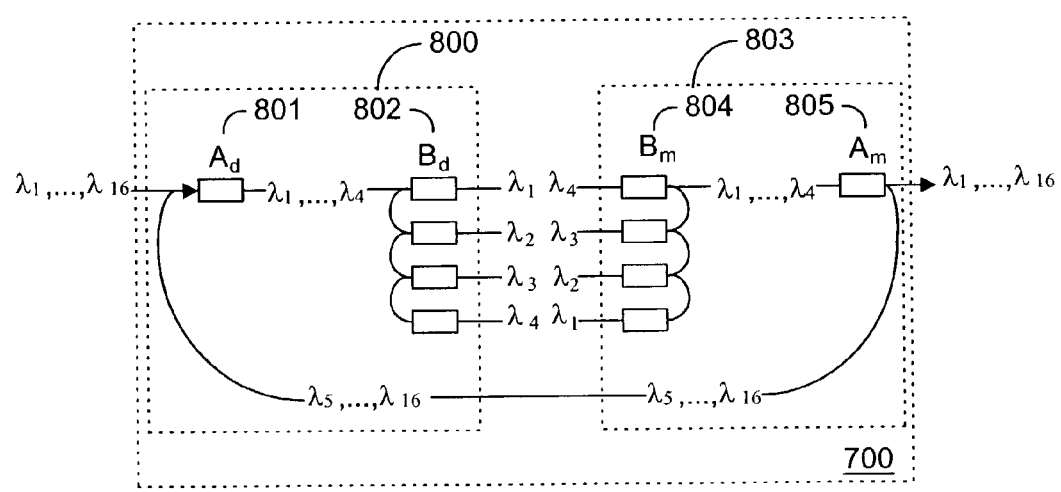
FIG. 8 is a block diagram illustrating a thin film filter loss model for a node of the network shown FIG. 7.

Referring now to FIG. 8, shown is a typical thin-film-filter (TFF) model for the add/drop functionality at a node 700. A ring fiber carries 16 CWDM channels into the node 700 on the demultiplexer side 800 as shown. If it is desired to add/drop wavelength band $B(1)=\{\lambda_1, \lambda_2, \lambda_3, \lambda_4\}$ from the ring, using edge filtering at point $A_d$ 801, the TFF transmits band $B(1)$ and reflects bands $B(2)$ to $B(4)=\{\lambda_5, \lambda_6, \lambda_{16}\}$. Further, at point $B_d$ 802, through a series of transmissions and reflections, the TFFs can demultiplex band $B(1)$ into its individual constituent wavelengths.

The reverse process takes place on the multiplexer side 803 in which the individual wavelengths $\{\lambda_1, \lambda_2, \lambda_3, \lambda_4\}$ are first multiplexed together as to obtain band $B(1)$ at point $B_m$ 804. Band $B(1)$ then combines with bands $B(2)$ to $B(4)$ at point $A_m$ 805. The 16 CWDM channels are again available for transmission on the next fiber section.

In the model shown in FIG. 8, bands $B(2)$ to $B(4) = \{\lambda_5, \lambda_6, \lambda_{16}\}$ incur express/through loss at points $A_d$ 801 and $A_m$ 805, while band $B(1)=\{\lambda_1, \lambda_2, \lambda_3, \lambda_4\}$ incurs a drop loss at point $A_d$ 801. Moreover, the wavelengths $\{\lambda_1, \lambda_2, \lambda_3, \lambda_4\}$ incur demultiplexing losses at point $B_d$ 802, and multiplexing losses at point $B_m$ 804 as they are demultiplexed and multiplexed into Band(1). Further band $(1)=\{\lambda_1, \lambda_2, \lambda_3, \lambda_4\}$ incurs an add loss at point $A_m$ 805.

The ring filter loss is then evaluated for the two cases satisfying (6): node-$N_k$-to-hub path is higher-loss-path and hub-to-node-$N_k$ path is higher-loss-path. In the first case the node-$N_k$-to-hub path is the higher-loss-path, from equation (6a):

$$\Rightarrow (n+1) > 2k. \quad (6a)$$

From FIG. 7, on the path node-$N_k$-to-hub, the filter loss $F(\lambda_i, k)$ incurred by a wavelength $\lambda_i$ is calculated as follows:

$$F(\lambda_i, k) = f_{mux} + f_{add} + (n-k) f_{exp} + f_{drop} + f_{demux} \text{ if } n+1 > 2k \quad (20)$$

where: $f_{mux}$ is the multiplexing loss at node $N_k$, $f_{add}$ is add loss at node $N_k$, $f_{exp}$ is the sum of express losses at nodes $N_{k+1}$ to $N_n$, $f_{drop}$ is the drop loss at the hub, and $f_{demux}$ is the demux loss at the hub.

In the second case, the hub-to-node-$N_k$ path is the higher-loss-path, from equation (6b):

$$\Rightarrow 2k > (n+1). \quad (6b)$$

On the path from the hub-to-node-$N_k$, the filter loss incurred by a wavelength $\lambda_i$ is:

$$F(\lambda_i, k) = f_{mux} + f_{add} + (k-1) f_{exp} + f_{drop} + f_{demux} \text{ if } 2k > n+1 \quad (21)$$

where: $f_{mux}$ is the multiplexing loss at the hub, $f_{add}$ is the add loss at the hub, $f_{exp}$ is the sum of the express losses at nodes $N_k$ to $N_n$, $f_{drop}$ is the drop loss at node $N_k$, and $f_{demux}$ Demux loss at node $N_k$.

Therefore, combining (20) and (21), the filter loss incurred by a wavelength $\lambda_i$ assigned to node-$N_k$ is given by:

$$F(\lambda_i, k) = \begin{cases} f_{mux} + f_{add} + (n-k) f_{exp} + f_{drop} + f_{demux} & \text{if } n+1 > 2k \\ f_{mux} + f_{add} + (k-1) f_{exp} + f_{drop} + f_{demux} & \text{if } 2k \geq n+1 \end{cases} \quad (22)$$

Following same procedure as for the filter loss derivations, the connector loss incurred by a wavelength $\lambda_i$ assigned to node-$N_k$ is given by:

$$C(\lambda_i, k) = \begin{cases} (n+1-k) c_{sp} & \text{if } n+1 > 2k \\ k c_{sp} & \text{if } 2k \geq n+1 \end{cases} \quad (23)$$

where: $c_{sp}$ is the connector loss per span.

Figures 9, 10:
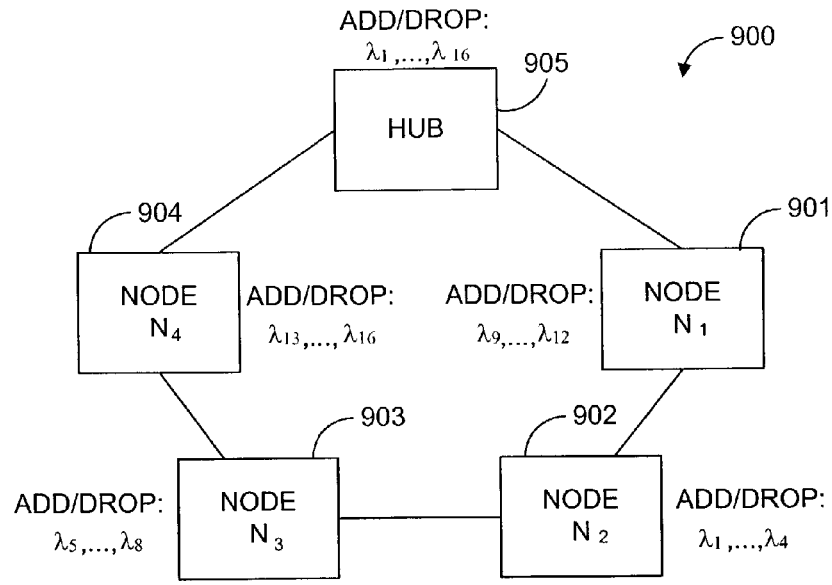
FIG. 9 is a block diagram of a four node hubbed ring optical network, using the wavelength assignment system of the present invention.
FIG. 10 is a table detailing the wavelength assignment system used in FIG. 9.

FIG. 9 shows the wavelength assignment system of the present invention used in a 16-Channel CWDM 4-node hubbed ring network 900. In contrast to FIG. 2, the wavelength assignment system of the present invention is employed to optimally assign wavelength bands to the nodes 901–904 such that the ring fiber, filter, connector and splice losses are minimized, consequently maximizing the ring perimeter. In FIG. 2, the bands are assigned sequentially to the nodes. The analysis results below demonstrate that the wavelength assignment system of the present invention maximizes the ring perimeter. In this analysis, it is assumed that the optical source power is –1 dBm, the APD receiver sensitivity is –29 dBm at 2.5 Gb/s, the allowable loss is 28 dB as specified by the channel plan. Furthermore, the ring includes 2 connectors per span, with each of the connectors causing a loss of 0.5 dB, and the system margin (splicing etc) is assumed to be 1 dB. The sixteen CWDM channels are dropped and added at the hub 905, and at each node, 4 channels are dropped and added while the other 12 channels are through/express.

In FIG. 9, a wavelength band is assigned to each node-$N_k$ according to the wavelength assignment system of the present invention:

$$N_k \xrightarrow{\text{is assigned}} B \begin{cases} (n+1-2k) & \text{if } n+1 > 2k \\ (2k-n) & \text{if } 2k \geq n+1 \end{cases}. \quad (1)$$

Where $B(j)$ is the wavelength band assigned to node-$N_k$, ($j=n+1-2k$ or $j=2k-n$), n is the number of nodes in the ring, k is the node number ($k=1 \ldots n$), and the wavelength assignment system of the present invention is as shown in FIG. 10.

Note that using the wavelength assignment system of the present invention, bands $B(1)$ and $B(2)$ traverse 3 spans, while bands $B(3)$ and band $B(4)$ traverse 4 spans. In other words, higher fiber attenuation O- and E-bands (bands $B(1)$ and $B(2)$) incur less filter, connector and splice losses than the lower fiber attenuation S-, C- and L-bands (bands $B(3)$ and $B(4)$). Consequently, the ring loss—the combined filter, fiber, connector and splice losses—is minimized across the CWDM channel spectrum, resulting in a maximized ring perimeter as shown in the results of the analysis.

Figure 11:
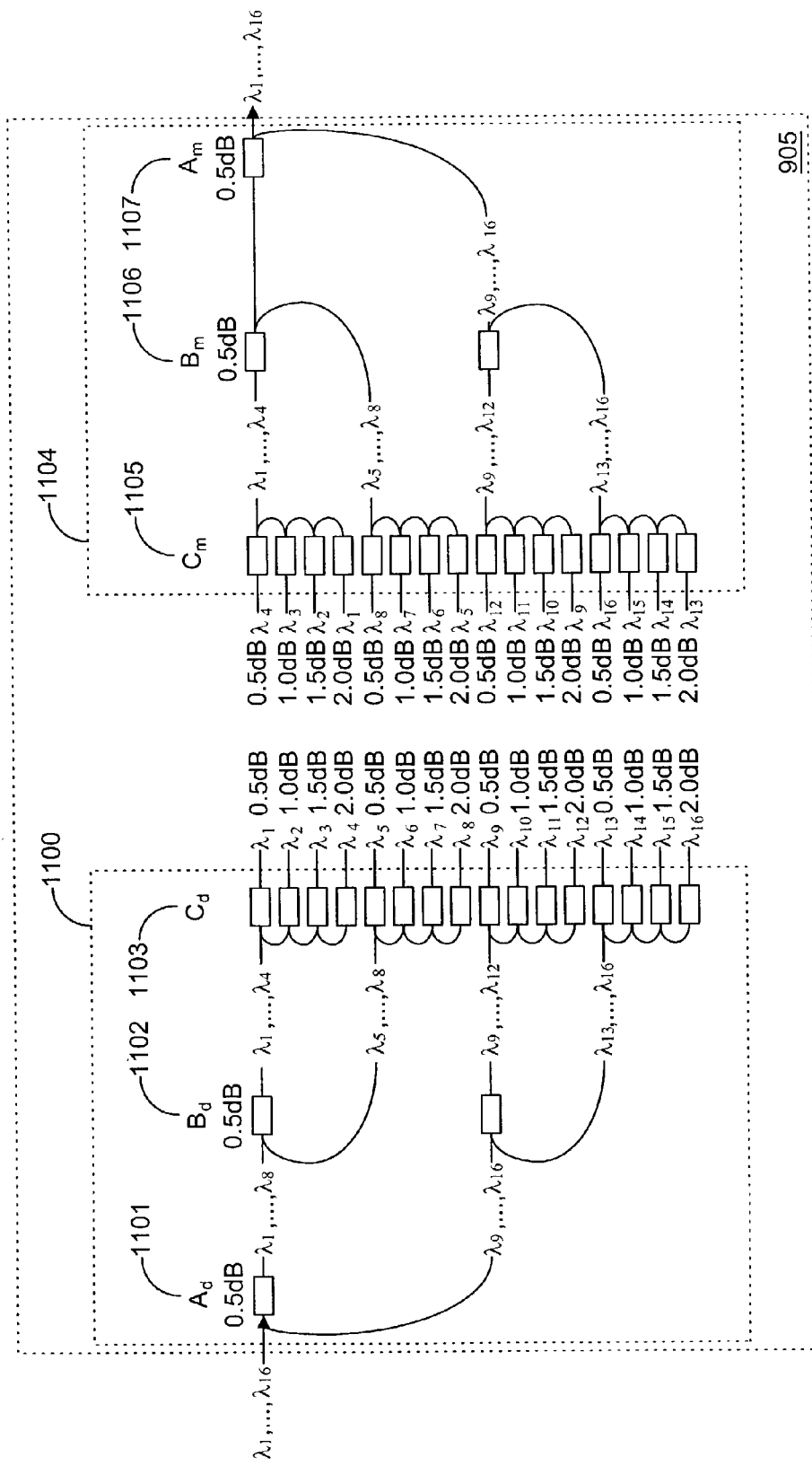
FIG. 11 is a block diagram illustrating a thin film filter loss model for the hub of FIG. 9.

Referring now to FIG. 11, shown is the TFF loss model (multiplexing and demultiplexing) for the hub 905. All wavelengths are added and dropped at the hub 905. Therefore, all 16 CWDM channels coming in on the ring fiber on the demultiplex side 1100 pass through a first stage TFF at point $A_d$ 1101. Using Edge filtering, wavelength bands B(1) and B(2)={$\lambda_1$–$\lambda_8$} are transmitted while bands B(3) and B(4)={$\lambda_9$–$\lambda_{16}$} are reflected by the TFF as shown. At point $B_d$ 1102, band B(1)={$\lambda_1$–$\lambda_4$} is transmitted while band B(2)={$\lambda_5$–$\lambda_8$} is reflected. Also at $B_d$ 1102, band B(3)={$\lambda_9$–$\lambda_{12}$} is transmitted while band B(4)={$\lambda_{13}$–$\lambda_{16}$} is reflected. All the bands are then available for demultiplexing into individual wavelengths via a series of transmissions and reflections at point $C_d$ 1103, using cascading TFFs.

The process is reversed on the multiplexing side 1104. The individual wavelength channels are multiplexed into bands at point $C_m$ 1105, using Cascading TFFs. Bands B(1) and B(2) and bands B(3) and B(4) are combined at point $B_m$ 1106, using Edge TFFs. Finally, all the bands are combined at point $A_m$ 1107 to obtain the 16 CWDM channels for transmission on the next fiber section.

The transmission and reflection losses for each of the TFFs are assumed to be 0.5 dB. Hence the loss incurred at each point by each band or individual wavelength is as shown in FIG. 11. In order to achieve a balanced multiplex/demultiplex loss, the bands are demultiplexed into individual wavelengths in reverse order to the order of multiplexing.

Figure 12:
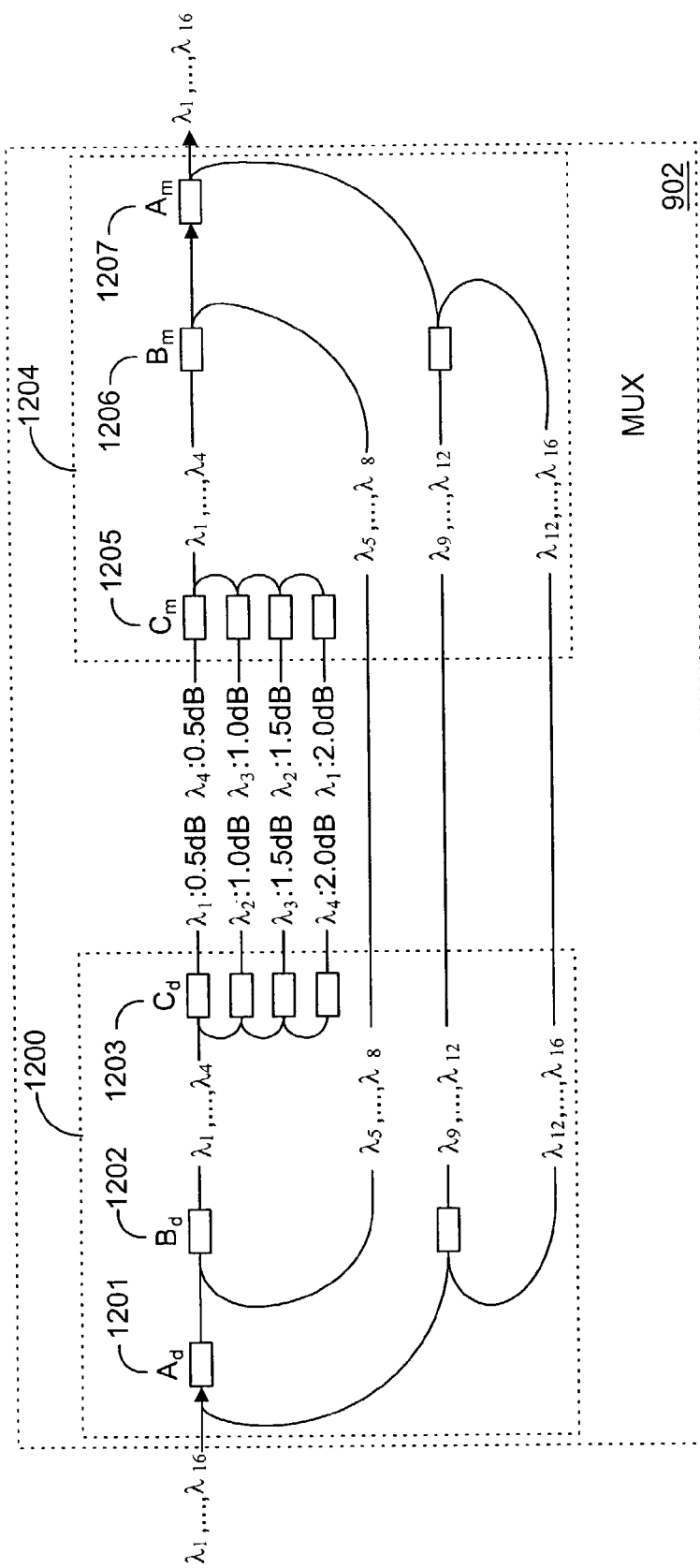
FIG. 12 is a block diagram illustrating a thin film filter loss model for the nodes of FIG. 9.

FIG. 12 shows TFF loss models for the node 902 where band B(1)={$\lambda_1$–$\lambda_4$} is added and dropped and bands B(2), B(3) and B(4)={$\lambda_5$–$\lambda_{16}$} pass through without dropping or adding. Therefore they incur express or through loss at the node. The express loss incurred by band B(2)={$\lambda_5$–$\lambda_8$} is 2 dB, and 1 dB for bands B(3) and B(4) {$\lambda_9$–$\lambda_{16}$}. The TFF losses for each of the nodes of the ring can be similarly modeled. The express loss is shown to vary from a minimum of 1 dB to a maximum of 2 dB for all bands. However, for computational convenience a uniform express loss of 2 dB is assumed for all bands.

For example, to calculate the filter loss incurred by wavelength $\lambda_1$ assigned to node-$N_2$ in the 4-node ring of the case of FIG. 9:

$$F(\lambda_i, k) = \begin{cases} f_{mux} + f_{add} + (n-k)f_{exp} + f_{drop} + f_{demux} & \text{if } n+1 > 2k \\ f_{mux} + f_{add} + (k-1)f_{exp} + f_{drop} + f_{demux} & \text{if } 2k > n+1 \end{cases} \quad (22)$$

with number of nodes n=4 and node $N_k$=$N_2$⇒k=2. Therefore, from (6), n+1=5>2k=4, and the higher-loss-path is from node-$N_2$-to-hub. Further, from (22), $F(\lambda_1,2)$=$f_{mux}$+$f_{add}$+2$f_{exp}$+$f_{drop}$+$f_{demux}$.

Referring to FIG. 5a: Hubbed Ring Network for the First Case, $f_{exp}$ Express losses at nodes $N_3$ and $N_4$=2 dB/node Referring to FIG. 6: TFF Filter Loss Model for the Hub, $f_{mux}$ Mux loss incurred by wavelength $\lambda_1$ at the hub (point $C_m$)=2 dB.

$f_{add}$ Add loss at the hub (points $B_m$ & $A_m$)=0.5 dB+0.5 dB=1 dB

Referring to FIG. 7: TFF Loss Model for the Nodes, $f_{drop}$ Drop loss at node $N_2$ (points $A_d$ & $B_d$)=0.5 dB+0.5 dB=1 dB $f_{demux}$ Demux loss at node $N_2$ (point $C_d$)=0.5 dB.

Thus, the filter loss incurred by wavelength $\lambda_1$ assigned to node-$N_3$ in the 4-node ring of the case of FIG. 9 is:
$F(\lambda_1,2)$=2 dB+1 dB+2×2 dB+1 dB+0.5 dB=8.5 dB Detailed filter losses for all 16 CWDM wavelength channels are shown in FIG. 13.

The fiber and connector losses and ring perimeters are calculated from (19), (23), and (15) respectively. The results for all 16 CWDM wavelength channels using the wavelength assignment system are shown in FIG. 14.

FIG. 15 is a table showing the prior art wavelength assignment for the network of FIG. 2. In this case, the filter losses for all 16 CWDM wavelength channels are shown in the table of FIG. 16, and the fiber and connector losses and ring perimeter attained for all 16 CWDM wavelength channels are shown in the table of FIG. 17.

Figures 17, 18:
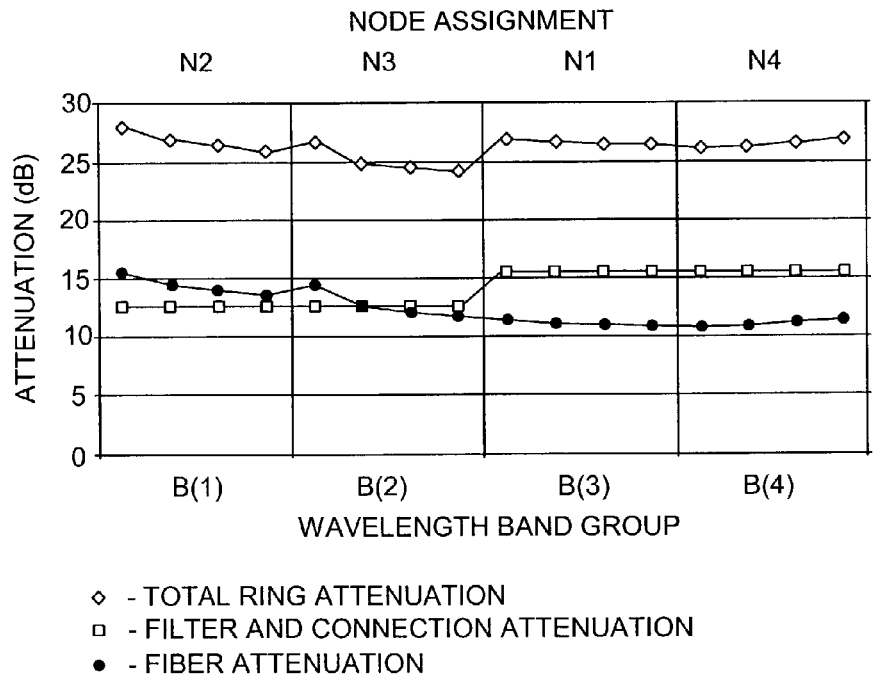
FIG. 17 is a table detailing the total loss of each of the channels on the network of FIG. 2, including the connector loss, filter loss and fiber loss.
FIG. 18 is a chart illustrating the filter, fiber and ring losses for the network of FIG. 9.

The chart of FIG. 18 shows the filter, fiber and ring losses for the network of FIG. 9, which uses the wavelength assignment system of the present invention. The losses are plotted as functions of the nodes $N_1$ to $N_4$ and their assigned wavelength bands B(1) to B(4). Using the wavelength assignment system of the present invention for a four node ringed hub, node $N_1$ is assigned band B(3), node $N_2$ is assigned band B(1), node $N_3$ is assigned band B(2), and node $N_4$ is assigned band B(4). The bands are divided by wavelength with B(1)={$\lambda_1$–$\lambda_4$}, B(2)={$\lambda_5$–$\lambda_8$}, B(3)={$\lambda_9$–$\lambda_{12}$}, and B(4)={$\lambda_{13}$–$\lambda_{16}$}. The channel number, center wavelength, and fiber attenuation are shown in FIG. 18.

Figure 19:
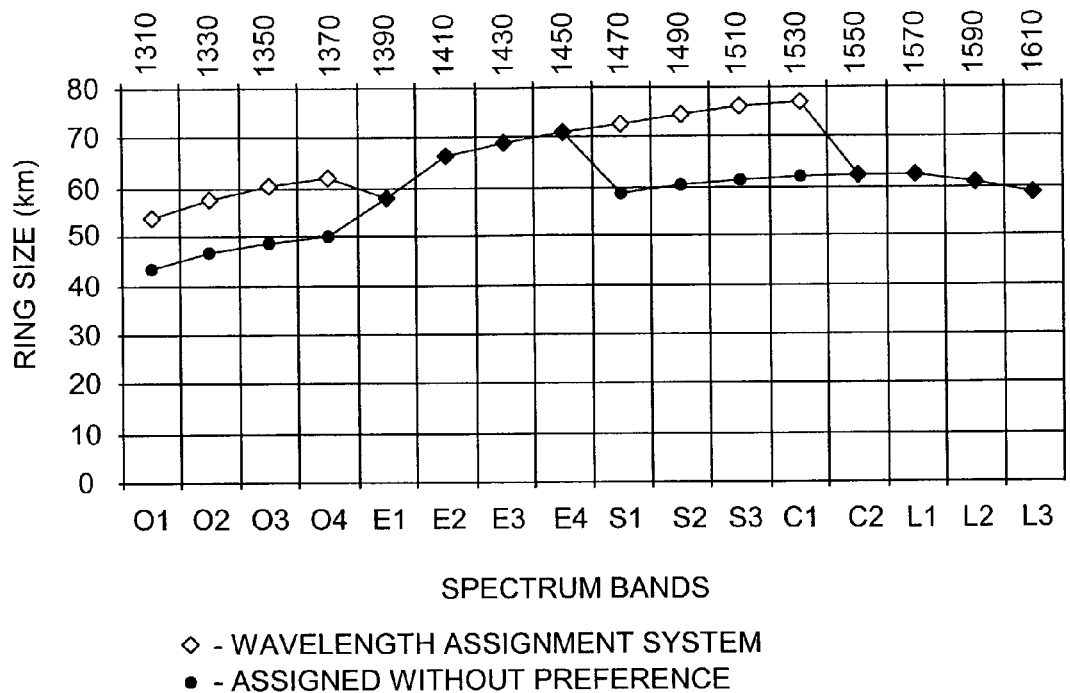
FIG. 19 is a chart illustrating the difference in ring perimeter attained using the wavelength assignment system versus using no assignment system.

The filter loss for bands B(1), B(2), B(3) and B(4) are 12.5 dB, 12.5 dB, 15.5 and 15.5 dB respectively. For the available budget of 28 dB, this leaves 28 dB–12.5 dB=15.5 dB for fiber loss in the higher attenuation O- and E-bands—bands B(1) and B(2) respectively. Therefore, this wavelength assignment system achieves a 15.5–12.5=3 dB in the O- and E-bands over the lower attenuation S, C, and L-bands. The 3 dB extra power margin compensates the higher fiber attenuation in the O- and E-bands, consequently yielding a ring perimeter of 54 km as shown in FIG. 19. The wavelength assignment system is used, and is plotted in FIG. 19 using a diamond shaped points.

Figure 20:
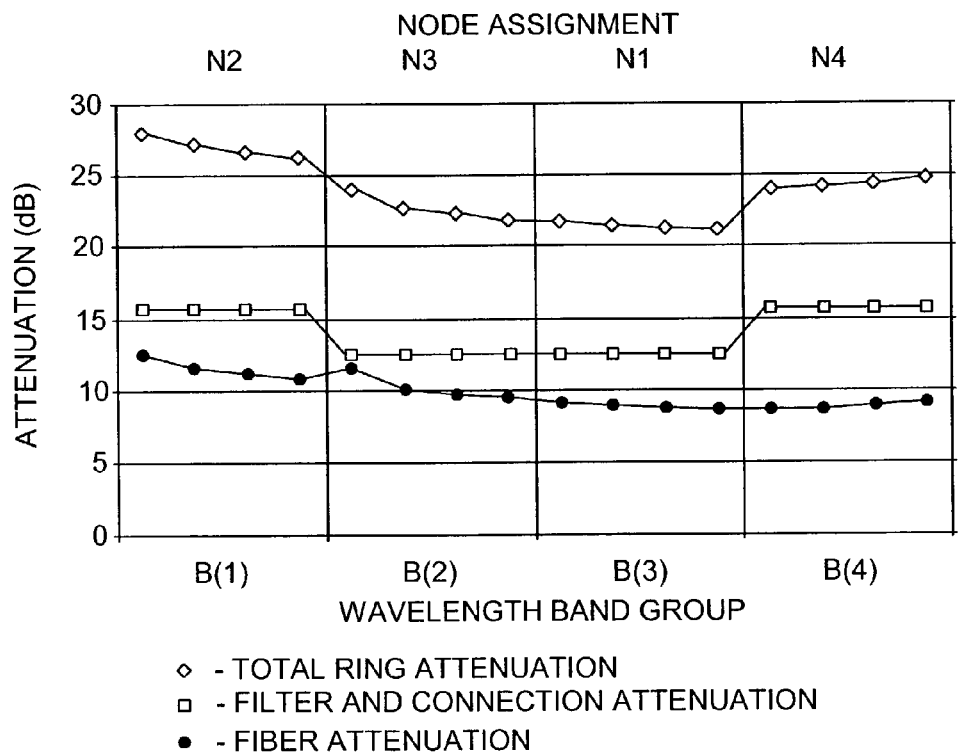
FIG. 20 is a chart illustrating the filter, fiber and ring losses for the network of FIG. 2.

Referring now to FIG. 20, the chart of FIG. 20 shows the filter, fiber and ring losses for the network of FIG. 2, which uses prior art wavelength assignment. The losses are plotted as functions of the nodes $N_1$ to $N_4$ and their assigned wavelength bands B(1) to B(4). In this case, the nodes are assigned wavelengths with no preference as follows: Node $N_1$ is assigned band B(1); Node $N_2$ is assigned band B(2); Node $N_3$ is assigned band B(3); and Node $N_4$ is assigned band B(4). Using this band assignment, the filter loss for bands B(1), B(2), B(3) and B(4) are 15.5 dB, 12.5 dB, 12.5 and 15.5 dB respectively.

For the available budget of 28 dB, this leaves 12.5 dB, 15.5 dB, 15.5 dB and 12.5 dB for fiber loss in bands B(1), B(2), B(3) and B(4) respectively. The higher attenuation O-band achieves a ring perimeter of 43 km as plotted by the circular dots in FIG. 19. The lower attenuation S, C and L-bands achieve much higher ring perimeters, however, the ring size is constrained to only 43 km by the higher loss O-band, as can be seen in FIG. 19.

The chart of FIG. 19 shows the attainable ring perimeters for both of FIG. 9, which uses the wavelength assignment system of the present invention, and FIG. 2, which uses prior art wavelength assignment. The ring perimeters are plotted as functions of the FS-CWDM center wavelengths and spectrum O-, E-, S-, C-, and L-Bands. It is seen from FIG. 19 that in the case of the prior art wavelength assignment of FIG. 2 (plotted with circular dots) that the ring perimeter attained varies from a minimum of 43 km in the 1310 nm channel in the O-Band to a maximum of 77 km in the 1530 nm channel of the C-Band. So, the maximum attainable ring perimeter is therefore constrained to 43 km.

By employing the wavelength assignment system of the present invention in FIG. 9 (plotted on FIG. 18 using diamonds) the ring perimeter attained varies from a minimum of 54 km in the 1310 nm channel in the O-Band to a maximum of 71 km in the 1450 nm channel of the E-Band. So, the maximum attainable ring perimeter in this case is 54 km, a 25% increase over the assignment of FIG. 2.

Figure 21:
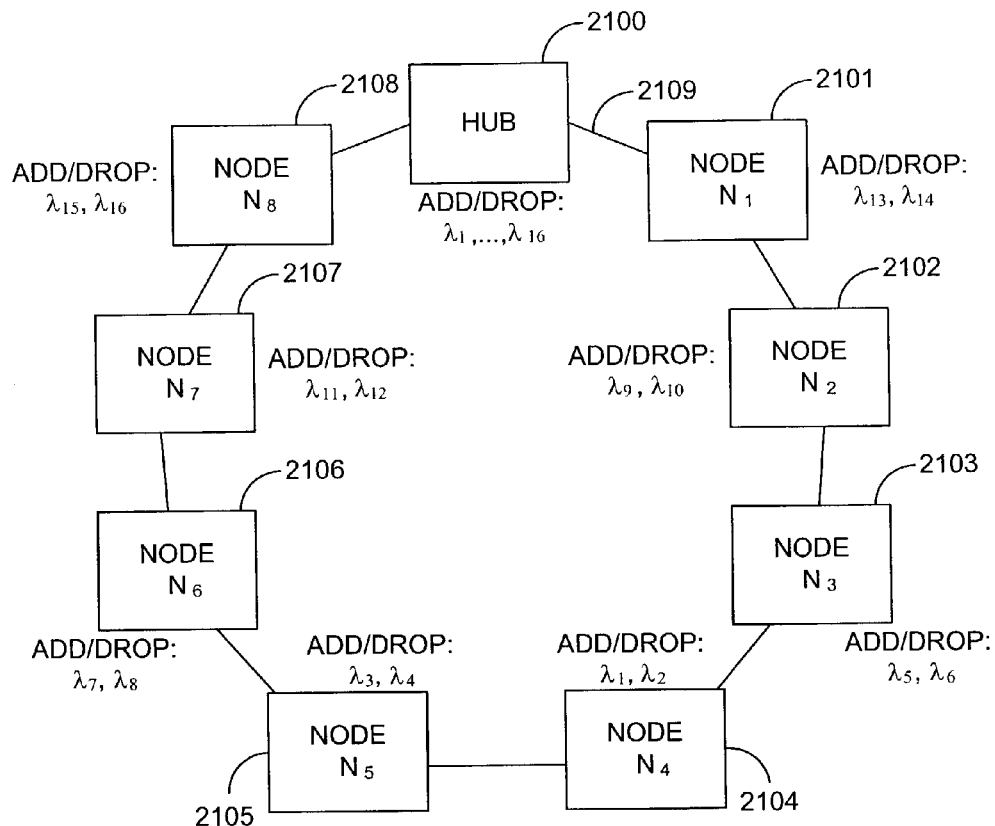
FIG. 21 is a block diagram illustrating an eight-node hubbed ring optical network using the wavelength assignment system of the present invention.

Referring now to FIG. 21, shown is an alternative embodiment, among others of the wavelength assignment system present invention. Shown is an eight-node hubbed ring network. The hub 2100 is surrounded by eight nodes 2101–2108, coupled together by a ZWPF 2109, and each being assigned a group of channels upon which to transmit and receive information. Typically in prior art networks, there has been no preference in the assignment of these wavelengths, and so each node was assigned a set of sequential wavelength channels. However, as shown in FIG. 21, each node has been assigned a set of wavelength channels according to the wavelength assignment system of the present invention.

Figure 22:
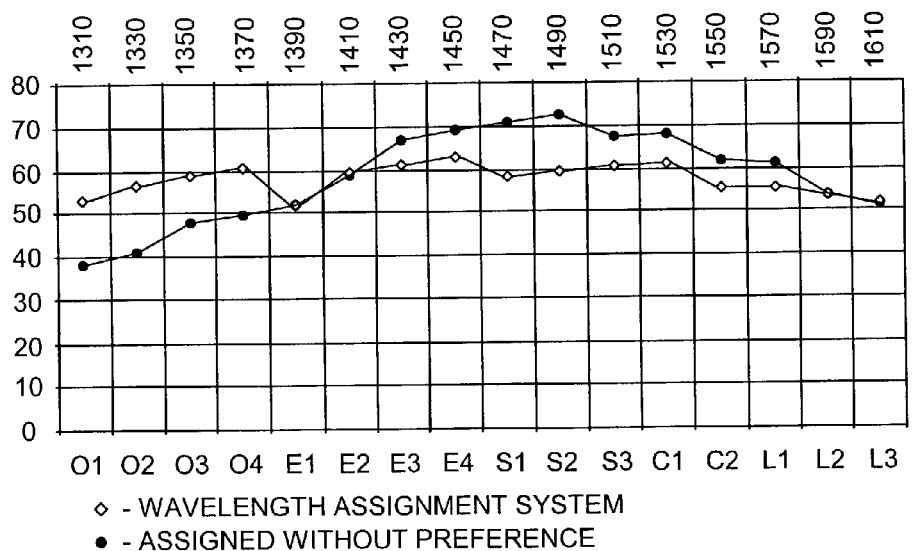
FIG. 22 is a chart illustrating the difference in ring perimeter attained using the wavelength assignment system versus using no assignment system.

Referring now to FIG. 22, shown is a chart illustrating the reach of the wavelength assignment system of the present invention, shown in FIG. 21, plotted against the reach of a network without preferential assignment of the wavelength channels (such as shown in, FIG. 3). As can be seen in FIG. 22, the maximum ring perimeter attained using the wavelength assignment system of the present invention is 51 km. In comparison, the maximum ring perimeter attained without any wavelength assignment preference is 38 km. As such, the wavelength assignment system of the present invention, used on an eight-node hubbed ring network, has increased the circumference of the coverage area by about 35%.

Figure 23:
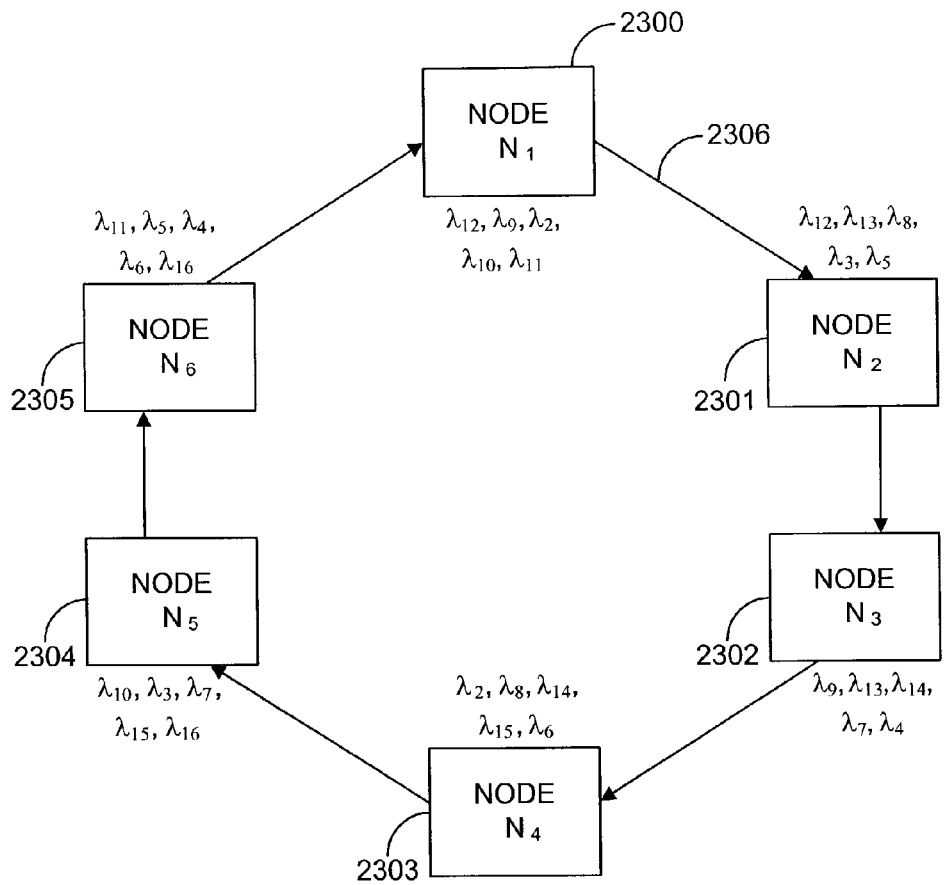
FIG. 23 is a block diagram illustrating a six-node meshed ring optical network using the wavelength assignment algorithm of the present invention.

Referring now to FIG. 23, shown is a further alternative embodiment, among others, of the wavelength assignment system of the present invention. Here, a six-node meshed ring network is implemented using the wavelength assignment system of the present invention. The nodes 2300–2305 in this embodiment are each coupled together by a ZWPF 2306, and transmit in a clockwise direction on the ring. Each of the nodes is assigned a channel upon which to communicate with every other node on the ring. Using the wavelength assignment system of the present invention, the assignment of the channels is as seen in FIG. 23.

Figure 24:
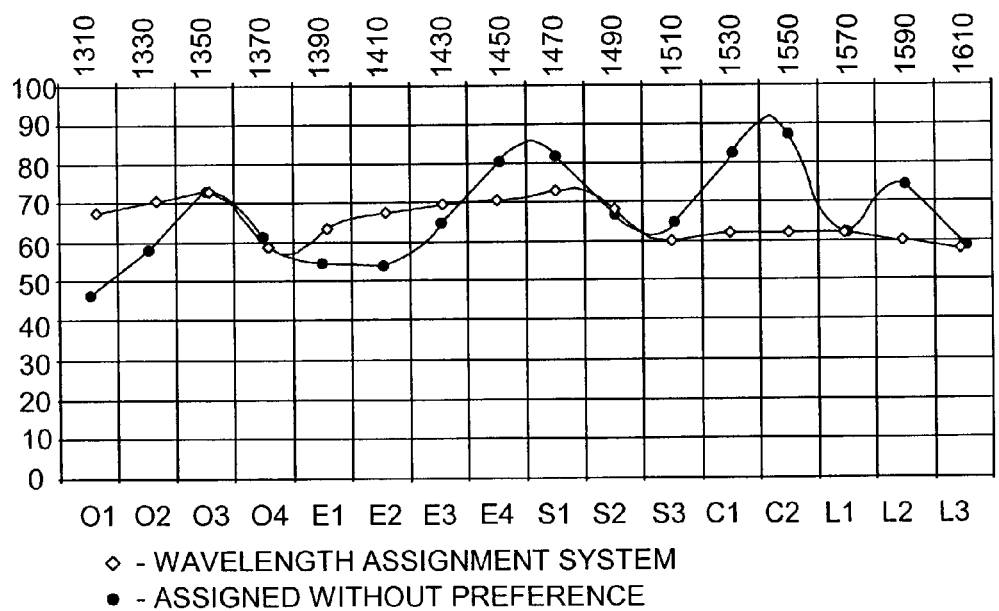
FIG. 24 is a chart illustrating the difference in ring perimeter attained using the wavelength assignment system versus using no assignment system.

Referring now to FIG. 24, shown is a chart illustrating the reach of wavelength assignment system of one embodiment of the present invention, shown in FIG. 23, plotted against the reach of a network without preferential assignment of the channels, as in FIG. 5. As can be seen in FIG. 24, the maximum ring perimeter attained using the wavelength assignment system of the present invention is 58 km. In comparison, the maximum ring perimeter attained without preferential assignment of the channels is 47 km. As such, the wavelength assignment system of the present invention, used on a six-node meshed ring network, has increased the circumference of the coverage area by about 24%.

The wavelength assignment system of the present invention maximizes the perimeter of the CWDM hubbed ring. The system assigns wavelengths to each of the nodes such that the filter, connector and splice losses incurred by the wavelengths is a minimum in the high fiber attenuation O-Band. The filter loss therefore compensates fiber loss such that the ring loss (combined fiber, filter, connector and splice losses) is minimized across the CWDM channel spectrum, thereby increasing the attainable ring size or perimeter.

By employing the wavelength assignment system of the present invention, the attainable perimeter of a four-node, 16-channel CWDM hubbed ring, with each channel operating at 2.5 Gb/s on a 28 dB loss budget, was increased from 43 km (where no preference in assignment was applied) to 54 km in the case employing the wavelength assignment system, a 25% increase. Moreover, to achieve a 43 km perimeter, a 25 dB loss budget was required, rather than the 28 dB provided. This wavelength assignment system therefore leads to a 3 dB savings in the power budget of the 16-channel CWDM hubbed ring.

As mentioned in the foregoing, reach limitation is an important shortcoming of the CWDM system. CWDM is shown to be very cost competitive versus DWDM, but since the CWDM system is non amplified its reach can be severely limited by fiber and filter losses, which then constrains the CWDM ring to perimeters in the order of 40 km. With the wavelength assignment system described above, the attainable ring perimeter has been increased by about 25% to over 50 km. When the reach is significantly extended, it increases the domain of applicability of CWDM and better positions the technology to compete with DWDM, time division multiplexing (TDM) and space division multiplexing (SDM) for metro network deployment. Furthermore, the commercial availability of G.652C fibers, such as OFS Fitel's AllWave®, a ZWPF, has increased the number of available CWDM channels throughout the optical spectrum compared to SSMF. ZWPFs further lower the cost of deploying CWDM systems in metro networks.

It should be recognized by one having skill in the art that the wavelength assignment system of the present invention is not limited to four node hubbed ring equivalent networks. Rather, the wavelength assignment system can be applied equally to hubbed or meshed ring equivalent networks to increase the perimeter of the ring.

Furthermore, it should be emphasized that the above-described preferred embodiments of the present invention are merely possible examples of implementations set forth for a clear understanding of the principles of the invention. Many variations and modifications may be made to the above-described preferred embodiment(s) of the invention without departing substantially from the principles of the invention. All such modifications and variations are intended to be included herein within the scope of this disclosure and the present invention and protected by the following claims.

What is claimed is:

1. A 16-channel coarse wavelength division multiplexing ring equivalent network, comprising:
   a plurality of nodes operable to be coupled together by an optical fiber;
   the optical fiber being operable to transport 16 channels, each of said 16 channels comprising a wavelength band; and
   each of the plurality of nodes being assigned to communicate on at least one channel in response to an attenuation level, the attenuation level including attenuation introduced by the optical fiber and by the plurality of nodes;
   wherein the channels are iteratively assigned such that a highest remaining fiber loss channel is assigned to a lowest remaining filter loss node.

2. The network of claim 1, wherein the 16 channels are separated from each other by approximately 20 nm.

3. The network of claim 2, wherein channels disposed in a wavelength region of approximately 1310–1610 nm.

4. The network of claim 1, wherein the network is a hubbed ring equivalent network such that a node is coupled between a first node and a last node.

5. The network of claim 4, wherein each of the 16 channels are assigned to nodes in accordance with their nominal wavelengths, the shortest wavelength channel being assigned to a nodes that is furthest from the hub, while longer wavelengths are assigned to nodes that are progressively closer to the hub, distance from the hub being a minimum of a clockwise and a counterclockwise distance between the hub and the node.

6. The network of claim 4, wherein the plurality of nodes comprises four nodes in the hubbed ring equivalent network.

7. The network of claim 4, wherein the plurality of nodes comprises eight nodes in the hubbed ring equivalent network.

8. The network of claim 1, wherein the network is a meshed ring equivalent network.

9. The network of claim 8, wherein the plurality of nodes comprises four nodes in the meshed ring equivalent network.

10. The network of claim 8, wherein the plurality of nodes comprises six nodes in the meshed ring equivalent network.

11. The network of claim 1, wherein at least one of the plurality of nodes comprises:
a demultiplexer coupled to a receiver; and
a multiplexer coupled to a transmitter.

12. The network of claim 11, wherein the receiver comprises: a first optical translator unit coupled to the demultiplexer and operable to translate an optical receive signal into an electrical receive signal.

13. The network of claim 12, wherein the transmitter comprises:
a second optical translator unit coupled to the multiplexer and operable to translate an electrical transmit signal into an optical transmit signal.

14. The network of claim 13, further comprising:
a communications logic coupled to the first and second optical translator units and operable to communicate on a network protocol.

15. A method for assigning wavelengths in a 16 channel coarse wavelength division multiplexing network, comprising:
finding a highest ring loss node on the network;
assigning a lowest fiber loss wavelength channel to the highest filter loss node; and
iteratively assigning each remaining node to a remaining wavelength channel based upon a highest remaining ring loss node receiving a lowest remaining fiber loss wavelength.

16. The method of claim 15, further comprising:
using a hubbed ring equivalent optical network.

17. The method of claim 16, further comprising: assigning a shortest wavelength channel to a node that is furthest from the hub, while assigning longer wavelength channels to nodes that are progressively closer to the hub, distance from the hub being a minimum of a clockwise distance and a counterclockwise distance between the hub and the node.

18. The method of claim 15, further comprising:
using a meshed ring equivalent optical network.

19. The network of claim 1, wherein filter losses incurred in the network are lower for the wavlengths in the O-band than for the wavelengths in the L-band.

20. A method for maximizing the coverage of an optical network, comprising:
creating a 16 channel coarse wavelength division multiplexing network comprising a plurality of nodes coupled in a ring equivalent configuration with an optical fiber; and
assigning each of the 16 channels to the plurality of nodes based upon the ring loss and fiber loss of the 16 channel coarse wavelength division multiplexing network;
wherein each of the 16 channels has a fiber loss characteristic, and each node has a ring loss characteristic; and
wherein assigning comprises iteratively assigning the channels such that the channel with a highest fiber loss characteristic is assigned to the node with a lowest filter loss characteristic.

21. The method of claim 20, further comprising: using the range of wavelengths from 1310 nm to 1610 nm for the plurality of wavelength groups.

22. The method of claim 14, further comprising:
defining 16 wavelength channels with 20 nm spacing between the channels.

23. The method of claim 21, further comprising
using a hubbed ring equivalent structure in building the optical network.

24. The method of claim 23, further comprising:
assigning a shortest wavelength channel to a node that is furthest from the hub, while assigning longer wavelength channels to nodes that are progressively closer to the hub, distance from the hub being a minimum of a clockwise distance and a counterclockwise distance between the hub and the node.

25. The method of claim 21, further comprising:
using a meshed ring equivalent structure in building the optical network.

* * * * *